US009100698B2

(12) United States Patent
Tummalapenta et al.

(10) Patent No.: US 9,100,698 B2
(45) Date of Patent: Aug. 4, 2015

(54) SYSTEMS AND METHODS FOR SHARING BANDWIDTH ACROSS MULTIPLE VIDEO STREAMS

(71) Applicant: MOTOROLA SOLUTIONS, INC., Schaumburg, IL (US)

(72) Inventors: Satyanarayan Tummalapenta, Bangalore Karnataka (IN); Tyrone D. Bekiares, Park Ridge, IL (US); Steven D. Tine, Buffalo Grove, IL (US); Srikanth Vukkadapu, Kavali (IN)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 199 days.

(21) Appl. No.: 13/662,040

(22) Filed: Oct. 26, 2012

(65) Prior Publication Data

US 2014/0122652 A1    May 1, 2014

(51) Int. Cl.
*H04N 21/462* (2011.01)
*H04N 21/6373* (2011.01)

(52) U.S. Cl.
CPC ....... *H04N 21/4622* (2013.01); *H04N 21/6373* (2013.01)

(58) Field of Classification Search
CPC ........... H04N 21/6373; H04N 21/4622; H04L 65/80; H04L 65/4084; H04L 47/805; H04L 47/14; H04L 67/2833; H04L 43/0829; H04L 12/2602; H04L 41/5022; H04L 43/00; H04L 43/16; H04L 47/26; H04L 47/263
USPC .................. 709/201–203, 217, 219, 227, 231
See application file for complete search history.

(56) References Cited

U.S. PATENT DOCUMENTS

| 5,929,916 | A | 7/1999 | Legall et al. |
| 6,529,552 | B1 | 3/2003 | Tsai et al. |
| 6,590,885 | B1 * | 7/2003 | Jorgensen ...................... 370/338 |
| 6,594,246 | B1 * | 7/2003 | Jorgensen ...................... 370/338 |
| 6,785,353 | B1 * | 8/2004 | Zakrzewski .................. 375/357 |
| 6,853,625 | B2 | 2/2005 | Burmeister et al. |
| 7,047,308 | B2 * | 5/2006 | Deshpande ................... 709/232 |
| 7,085,230 | B2 | 8/2006 | Hardy |
| 7,412,517 | B2 * | 8/2008 | Jorgensen ..................... 709/226 |
| 7,443,797 | B2 | 10/2008 | Cheung et al. |
| 7,453,893 | B2 | 11/2008 | Li et al. |
| 7,489,656 | B2 | 2/2009 | Guo et al. |

(Continued)

FOREIGN PATENT DOCUMENTS

EP        1296479 A1     3/2003
WO     2005109821 A1    11/2005

OTHER PUBLICATIONS

PCT International Search Report Dated May 20, 2014 for Counterpart Application PCT/US2013/066548.

(Continued)

*Primary Examiner* — Sargon Nano
(74) *Attorney, Agent, or Firm* — Kenneth A. Haas

(57) ABSTRACT

A client-based method, a server-based method, and a client device enable streaming of multiple video streams utilizing standardized methods while ensuring the multiple video streams share bandwidth over a single, variable connection such as a wireless connection. These methods and device enable an equitably share of bandwidth across multiple video streams sharing a same physical medium. Further, these methods and device can enable selective prioritization of any of the multiple streams.

16 Claims, 14 Drawing Sheets

(56) References Cited

U.S. PATENT DOCUMENTS

| | | | |
|---|---|---|---|
| 7,536,460 B2* | 5/2009 | Anschutz et al. | 709/226 |
| 7,558,869 B2* | 7/2009 | Leon et al. | 709/231 |
| 7,571,246 B2 | 8/2009 | Virdi et al. | |
| 7,734,762 B2 | 6/2010 | Hundscheidt et al. | |
| 7,743,141 B2* | 6/2010 | Wang et al. | 709/224 |
| 7,784,076 B2 | 8/2010 | Demircin et al. | |
| 7,991,904 B2 | 8/2011 | Melnyk et al. | |
| 8,522,293 B2* | 8/2013 | Gonder et al. | 725/98 |
| 8,559,465 B2* | 10/2013 | Brooks et al. | 370/505 |
| 2002/0049628 A1* | 4/2002 | West et al. | 705/10 |
| 2002/0080719 A1* | 6/2002 | Parkvall et al. | 370/235 |
| 2002/0178330 A1* | 11/2002 | Schlowsky-Fischer et al. | 711/133 |
| 2003/0198184 A1* | 10/2003 | Huang et al. | 370/231 |
| 2004/0066753 A1 | 4/2004 | Grovenburg | |
| 2004/0156624 A1* | 8/2004 | Kent et al. | 386/125 |
| 2004/0165527 A1* | 8/2004 | Gu et al. | 370/229 |
| 2004/0252701 A1* | 12/2004 | Anandakumar et al. | 370/395.21 |
| 2005/0076113 A1* | 4/2005 | Klotz et al. | 709/224 |
| 2005/0089043 A1* | 4/2005 | Seckin et al. | 370/395.21 |
| 2006/0130113 A1* | 6/2006 | Carlucci et al. | 725/118 |
| 2007/0263072 A1* | 11/2007 | Lochbaum et al. | 348/14.08 |
| 2008/0259966 A1 | 10/2008 | Baird et al. | |
| 2009/0234965 A1* | 9/2009 | Viveganandhan et al. | 709/231 |
| 2010/0098176 A1* | 4/2010 | Liu | 375/259 |
| 2010/0215339 A1* | 8/2010 | Wang et al. | 386/68 |
| 2010/0268836 A1* | 10/2010 | Jabri et al. | 709/231 |
| 2011/0026414 A1* | 2/2011 | Banerjee | 370/252 |
| 2011/0119546 A1* | 5/2011 | Ver Steeg et al. | 714/748 |
| 2012/0101661 A1* | 4/2012 | Phillips et al. | 701/2 |
| 2012/0140018 A1* | 6/2012 | Pikin et al. | 348/14.02 |
| 2014/0033242 A1* | 1/2014 | Rao et al. | 725/14 |
| 2014/0122652 A1* | 5/2014 | Tummalapenta et al. | 709/219 |

OTHER PUBLICATIONS

Venkata N. Padmanabhan, "Coordinating Congestion Management and Bandwidth Sharing for Heterogeneous Data Streams", NOSSDAV, 1999, 5 Pages.

* cited by examiner

|  | Profile 1 | Profile 2 | Profile 3 | Profile 4 | Profile 5 |
|---|---|---|---|---|---|
| Src A | Pa1 | Pa2 | Pa3(D) | Pa4 | Pa5 |
| Src B | Pb1 | Pb2 | Pb3 | Pb4(D) | Pb5 |
| Src C | Pc1 | Pc2 | Pc3(D) | Pc4 | Pc5 |
| Src D | Pd1 | Pd2(D) | Pd3 | Pd4 | Pd5 |
| Src E | Pe1 | Pe2 | Pe3(D) | Pe4 | Pe5 |

*FIG. 2*

Fig: Loss reported on 4 streams

SYSTEMS AND METHODS FOR SHARING BANDWIDTH ACROSS MULTIPLE VIDEO STREAMS

FIELD OF THE DISCLOSURE

The present disclosure relates generally to wireless networks and more particularly to systems and methods for sharing bandwidth across multiple video streams in a wireless network.

BACKGROUND

In wireless networks, available effective bandwidth can vary from time to time depending on the channel conditions. For video over wireless networks and for good user experience, video senders need to adapt transmission bit rate based on available bandwidth. The video senders can rely on feedback from receivers to "guess" the available bandwidth. The feedback can include a RTP Control Protocol (RTCP) receiver report in Real-time Transport Protocol (RTP) for User Datagram Protocol (UDP) based systems or the effective throughput as seen by the sender in case of Hypertext Transfer Protocol (HTTP) based systems. Note, this feedback is on a per-stream basis, e.g. for each RTP media stream, there is a corresponding RTCP feedback channel which carries feedback about that and only that media stream. In clients (receivers) which receive more than one video stream at a time, various problems exist in conventional systems and methods. For example, since RTCP receiver reports are independent and are specific to a stream, the actions taken in response to these reports are applied only to those streams. For example, bit rate upshifts and downshifts will happen independently for each stream. The feedback intervals usually will not be aligned (though equal in duration) as each stream is an independent session and could have been established at different times. Due to the non-alignment, a spurt in losses may or may not result in all streams downshifting at the same time and some may not downshift at all. Similarly, not having any losses over a period of time may or may not result in all streams upshifting and some may not upshift at all. This unsynchronized behavior will cause some streams downshift too much and some other streams upshift too much, resulting in asymmetric profiles. From a user perspective, this would result in seeing one stream with good quality and another stream with bad quality on a same wireless connection.

Accordingly, there is a need for fairly sharing bandwidth across multiple video streams in a wireless network. Similarly, in some situations there could be a need for the client to differentiate between multiple streams in terms of quality in lossy conditions, during the session. It might want to accord higher priority to some streams compared to others.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a block diagram of an exemplary operation of five video streams sent wirelessly to a client device with five profiles in accordance with some embodiments.

Figure 1:
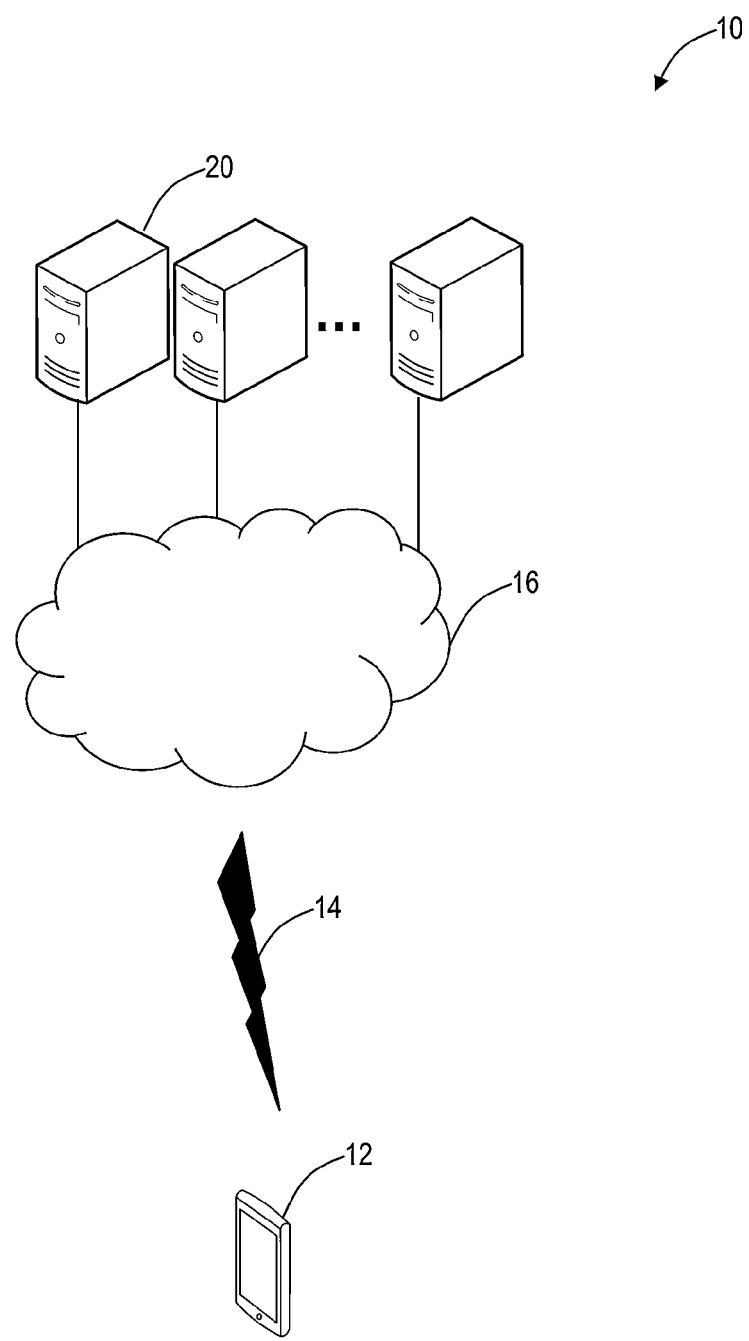
FIG. 1 is a block diagram of a multiple video stream system for fairly sharing bandwidth in a wireless network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an exemplary embodiment, a client-based method includes receiving a plurality of video streams at a client device over a wireless connection, wherein each of the plurality of video streams operates at one of a plurality of associated profiles, determining feedback for each of the plurality of video streams, determining modified feedback for each of the plurality of video streams based on the feedback for each of the plurality of video streams, and transmitting the modified feedback for each of the plurality of video streams to an associated source of each of the plurality of video streams.

In another exemplary embodiment, a server-based method includes transmitting a plurality of video streams to a client device from at least one server, wherein each of the plurality of video streams operates at one of a plurality of associated profiles, receiving feedback for each of the plurality of video streams, wherein the feedback is modified by at least one server such that each of the plurality of video streams has substantially a same bandwidth, determining if adjustments are required to associated profiles of each of the plurality of video streams, and, if adjustments are required, transmitting the plurality of video streams at different associated profiles of the plurality of associated profiles based on the adjustments.

In yet another exemplary embodiment, a client device includes a network interface communicatively coupled to a wireless network, a processor communicatively coupled to the network interface, and memory storing instructions that, when executed, cause the processor and the network interface to: receive a plurality of video streams at a client device over the wireless network, wherein each of the plurality of video streams operates at one of a plurality of associated profiles, determine feedback for each of the plurality of video streams, determine modified feedback for each of the plurality of video streams based on the feedback for each of the plurality of video streams, and transmit the modified feedback for each of the plurality of video streams to an associated source of each of the plurality of video streams.

Referring to FIG. 1, in an exemplary embodiment, a block diagram illustrates a multiple video stream system 10 for fairly sharing bandwidth in a wireless network. In particular, the system 10 includes a client device 12 with a wireless connection 14 to a network 16. For example, the client device 12 can include a digital cellular phone, a smart phone, a personal digital assistant, a tablet device, an ultra book, a net book, a laptop, a mobile data terminal, a desktop with a wireless interface, or the like. The system 10 further includes one or more servers 20 which are communicatively coupled to the network 16. In an exemplary embodiment, the network 16 can include the Internet, Virtual Private Networks (VPNs), Local Area Networks (LANs), Wireless provider networks (e.g., 3G, 4G, etc.), Wireless LAN (WiFi), and combinations thereof. That is, the client device 12 can connect to a wireless network which is communicatively coupled to a private or public IP network (such as Internet). The servers 20 can connect to a LAN which is communicatively coupled to the network (such as Internet). In FIG. 1, these various networks are singularly illustrated by the network 16 for illustration purposes.

In operation, the system 10 includes the servers 20 and the client device 12 streaming multiple video streams therebetween with various mechanisms for effective bit rate management of the multiple video streams in a consolidated or collective manner. Importantly, these mechanisms in the system 10 ensure a user of the client device 12 does not see one stream go down to the lowest profile (i.e., lowest quality) where as the other streams stay at higher profile (i.e., higher quality), when all the streams are sharing the same physical medium and are expected to see same channel conditions. In various exemplary embodiments, the system 10 can utilize RTCP, RTP, UDP, HTTP, etc. RTCP and RTP are defined in RFC 3550 (July 2003), "RTP: A Transport Protocol for Real-Time Applications," the contents of which are incorporated by reference herein.

Variously, bit rate management systems and methods are implemented in the system 10 in a manner fully preserving operation of the various standards and protocols thereby not impacting interoperability with existing devices. These bit rate management systems and methods can be implemented in one of the client device 12 or the servers 20. For example, if the bit rate management systems and methods are implemented in the client device 12, the server 20 could operate fully in accordance with existing standards and protocols without modification thereof. Conversely, if the bit rate management systems and methods are implemented in the server 20, the client device 12 could operate fully in accordance with existing standards and protocols without modification thereof. No extensions are required to RTP, RTCP, etc. protocol messages so the bit rate management systems and methods can operate with any standards compliant devices.

Referring to FIG. 2, in an exemplary embodiment, a block diagram illustrates an exemplary operation 25 of five video streams 26 sent wirelessly to a client device with five profiles 28. As described herein, in lossy wireless networks, the available effective bandwidth could vary from time to time, depending on the channel conditions. To improve user experience, video senders (e.g., the servers 20) adapt their bit rate based on available bandwidth. The video senders rely on feedback from the receivers (e.g., the client device 12) to "guess" the available bandwidth. The feedback is usually one of the following: RTCP Receiver report in RTP/UDP-based systems or effective throughput as seen by the sender in case of HTTP based systems. As described herein, a profile defines how a source is transmitted from the video sender to the client in terms of bit rates, frame rates, resolution, etc. It is expected that each source will have multiple profiles that may be upshifted or downshifted to/from based on current channel conditions. RTP/RTCP receiver reports are described in RFC 3550 and extensions are described in RFC 3611 (November 2003), "RTP Control Protocol Extended Reports (RTCP XR)," the contents of which are incorporated by reference herein.

The video sender, e.g. the servers 20, can employ the following techniques. The video sender can maintain a predefined set of profiles, e.g. the profiles 28, and typically with each profile has a different bit rate and possibly different resolution and frame rate. Depending on the feedback and "guessed-channel-bandwidth", the video sender moves to the profile best suited for that channel condition. The feedback report is usually for a pre-defined interval (e.g., in case of RTCP, it is the receiver report (RR) interval or, in the case of HTTP, it is effective throughput as seen by the sender during that interval). Multiple such reports (consecutive) are considered for taking a decision to downshift (move to a lower profile) or upshift (move to an upper profile) to avoid taking decisions based on random one-time events. The video sender will upshift or downshift depending on whether it sees increase or decrease in bandwidth. Advantageously, this helps the end users receive a better viewing experience.

In the exemplary operation 25, the client device is viewing the five streams 26 simultaneously. Each of the streams 26 has five corresponding profiles 28 and a default profile (designated with a (D) in FIG. 2). These profiles and default profiles can be preconfigured by the administrator based on the client network and other conditions. Note, the default profile does not need to be the middle profile 34. For example, taking Source A (Src A) as an example, the profile Pa1 has a lower bit rate, lower resolution, and/or lower frame rate from the profile Pa2, the profile Pa2 is lower than the profile Pa3, etc. When the client connects to the video sender, the video sender typically starts with the default profile. If the video sender sees bad channel conditions, the video sender downshifts to a lower profile, and if the video sender sees good channel conditions, the video sender tries to upshift to a higher profile.

In conventional systems and methods the feedback is on a per-stream basis. In the system 10 and with the bit rate management systems and methods implemented thereon, the feedback is on an aggregate basis across all of the streams. In an exemplary embodiment, using RTCP, the feedback is modified at the client device 12 such that each of the servers 20 upshifts or downshifts each of the video streams in a uniform manner. In such configurations, the servers 20 can be fully compliant to RTCP without requiring modifications to implement the bit rate management systems and methods. Here, the client device 12 also sends the RTCP RR reports in a fully compliant manner to RTCP with preprocessing done of the data to ensure that the video streams are handled in the uniform manner. In another exemplary embodiment, the servers 20 can utilize the effective throughput in HTTP to ensure the video streams are handled in the uniform manner.

Accordingly, with the bit rate management systems and methods, one of the streams 26 does not downshift its profile 28 while another one of the streams 26 upshifts its profile 28. The existing standards and protocols include feedback loops to manage video streams over varying channels such as wireless. However, this feedback loops operate autonomously on separate streams on the same physical link. The bit rate management systems and methods utilize these feedback loops by managing the input or output on either side of these feedback loops to maintain compliance to existing standards and protocols while simultaneously removing this autonomous operation on separate streams on the same physical link. Thus, the bit rate management systems and methods provide uniform viewing of multiple video streams in a standards compliant manner without modifying the over air signaling, all modifications are either done at the client device 12 or the server 20.

Figure 3:
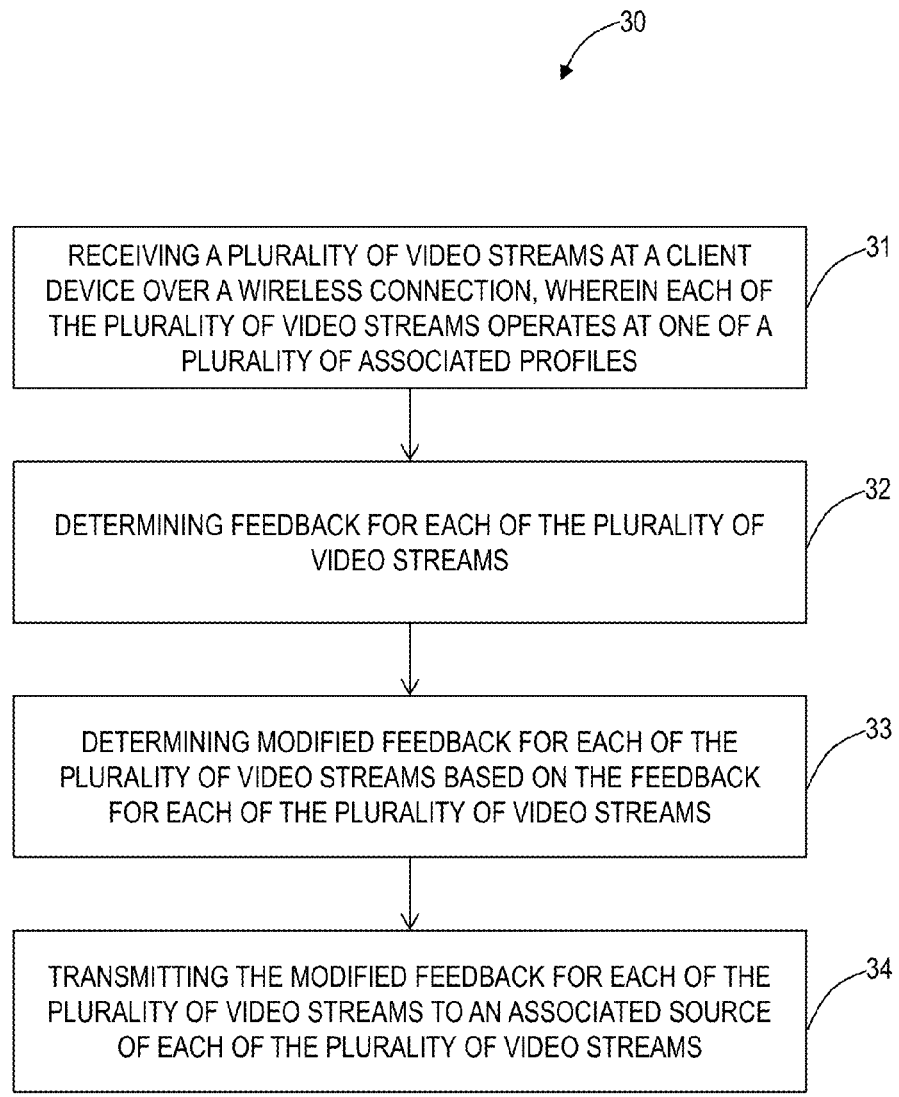
FIG. 3 is a flowchart of a client-based method for fairly sharing bandwidth across multiple video streams in accordance with some embodiments.

Referring to FIG. 3, in an exemplary embodiment, a flowchart illustrates a client-based method 30 for fairly sharing bandwidth across multiple video streams. In an exemplary embodiment, the client-based method 30 can be implemented by the client device 12 in the system 10. For example, the client device 12 can include a network interface communicatively coupled to a wireless network, such as via the wireless connection 14, a processor communicatively coupled to the network interface, and memory storing instructions that, when executed, cause the processor and the network interface to perform the various steps described herein. The client-based method 30 includes receiving a plurality of video streams at a client device over a wireless connection, wherein each of the plurality of video streams operates at one of a plurality of associated profiles (step 31).

The client-based method 30 includes determining feedback for each of the plurality of video streams (step 32). The client-based method 30 contemplates use with various protocols which rely on feedback loops from the client device to the associated video sources to determine whether appropriate adjustments. For example, the client-based method 30 contemplates use with RTP, RTCP, UDP, etc., and not with Transmission Control Protocol (TCP) which is a connection-oriented protocol with the video sources already knowing throughput without requiring feedback from the client device. An objective of the client-based method 30 is to modify inputs or outputs of these feedback loops such that there are no modifications or extensions to existing protocols (i.e., RTP, RTCP, UDP, etc.) and such that the plurality of video streams are seen in a consistently similar manner, i.e. such that each of the plurality of video streams has about the same amount of bandwidth on the same wireless connection.

The feedback can include any mechanism that alerts the associated sources of each of the plurality of video streams to required adjustments (or not). In an exemplary embodiment, the feedback can be packet loss ratio (or packet loss rate) over some reporting interval, e.g. 5 s. This feedback tells the associated sources whether or not the plurality of video streams need to be adjusted (i.e., upshifted or downshifted in profile). The client-based method 30 includes determining modified feedback for each of the plurality of video streams based on the feedback for each of the plurality of video streams (step 33). An objective of the client-based method 30 is to modify this feedback at the client device so as to ensure consistency in the plurality of video streams and to maintain operation in accordance with existing standards and protocols. Finally, the client-based method includes transmitting the modified feedback for each of the plurality of video streams to an associated source of each of the plurality of video streams (step 34).

The determination of the modified feedback can be performed using various techniques by the client device to ensure consistency between the plurality of video streams. In an exemplary embodiment, the modified feedback can include sending "averaged" reports to the associated sources. Here, the client device can group the individual streams as one stream when computing the packet loss ratio (PLR). The weighted average PLR computed across multiple streams, can be forwarded as the PLR for individual streams. With this, the associated sources treat all the plurality of video streams similarly, i.e. the upshift or downshift will happen for all the streams at the same time.

In another exemplary embodiment, the modified feedback can include sending "manipulated" reports to the associated sources. Here, the client device sends reports based on what the client device wants to the associated sources to see, rather than what the client device actually sees on the plurality of video streams. For example, if the associated sources are sending two streams at 380 and 280 kbps respectively, but the client device is receiving them at 360 kbps and 280 kbps, and the client device wants them to share the available 640 kbps bandwidth equally, the client device reports the losses in such a way that both the streams move up to 320 kbps. In this "manipulated" report method, the client device may not see the associated sources operating at the same profile for all the streams, as the client device is actually determining what the absolute bit rate should be for each stream.

Figure 4:
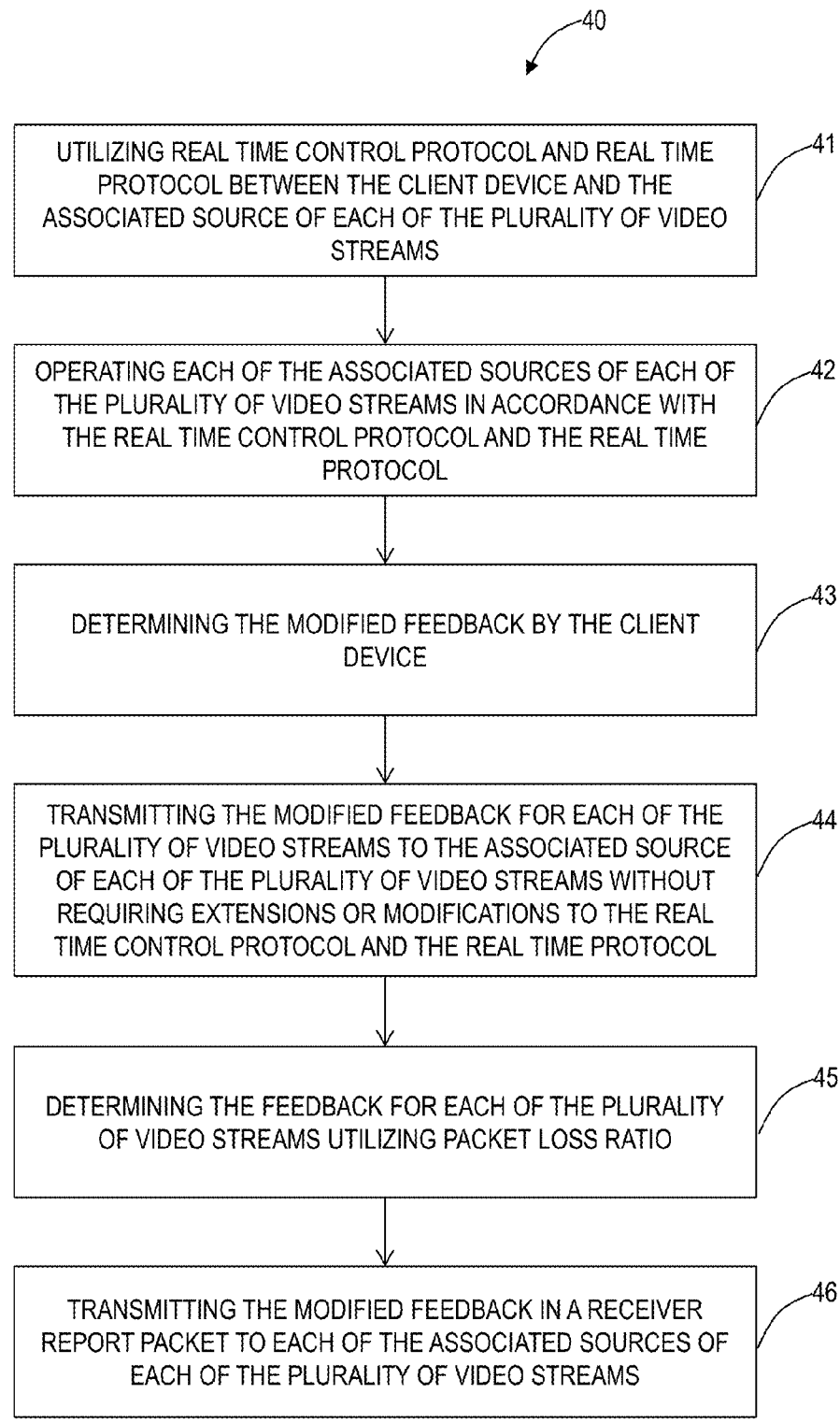
FIG. 4 is a flowchart of a RTP protocol method for use with the client-based method of FIG. 3 in accordance with some embodiments.

Referring to FIG. 4, in an exemplary embodiment, a flowchart illustrates a RTP protocol method 40 for use with the client-based method 30 of FIG. 3. The RTP protocol method 40 includes utilizing Real Time Control Protocol and Real Time Protocol between the client device and the associated source of each of the plurality of video streams (step 41). Again, as described herein, an objective of the RTP protocol method 40 is to maintain standards compliant over-the-air signaling between the client device and the associated sources. The RTP protocol method 40 includes operating each of the associated sources of each of the plurality of video streams in accordance with the Real Time Control Protocol and the Real Time Protocol (step 42). The RTP protocol method 40 includes determining the modified feedback by the client device (step 43).

The RTP protocol method 40 further includes transmitting the modified feedback for each of the plurality of video streams to the associated source of each of the plurality of video streams without requiring extensions or modifications to the Real Time Control Protocol and the Real Time Protocol (step 44). The RTP protocol method 40 further includes determining the feedback for each of the plurality of video streams utilizing packet loss ratio (step 45). The RTP protocol method 40 further includes transmitting the modified feedback in a Receiver Report packet to each of the associated sources of each of the plurality of video streams. Of note, the Receiver Report packet is defined in RFC 3550.

Figure 5:
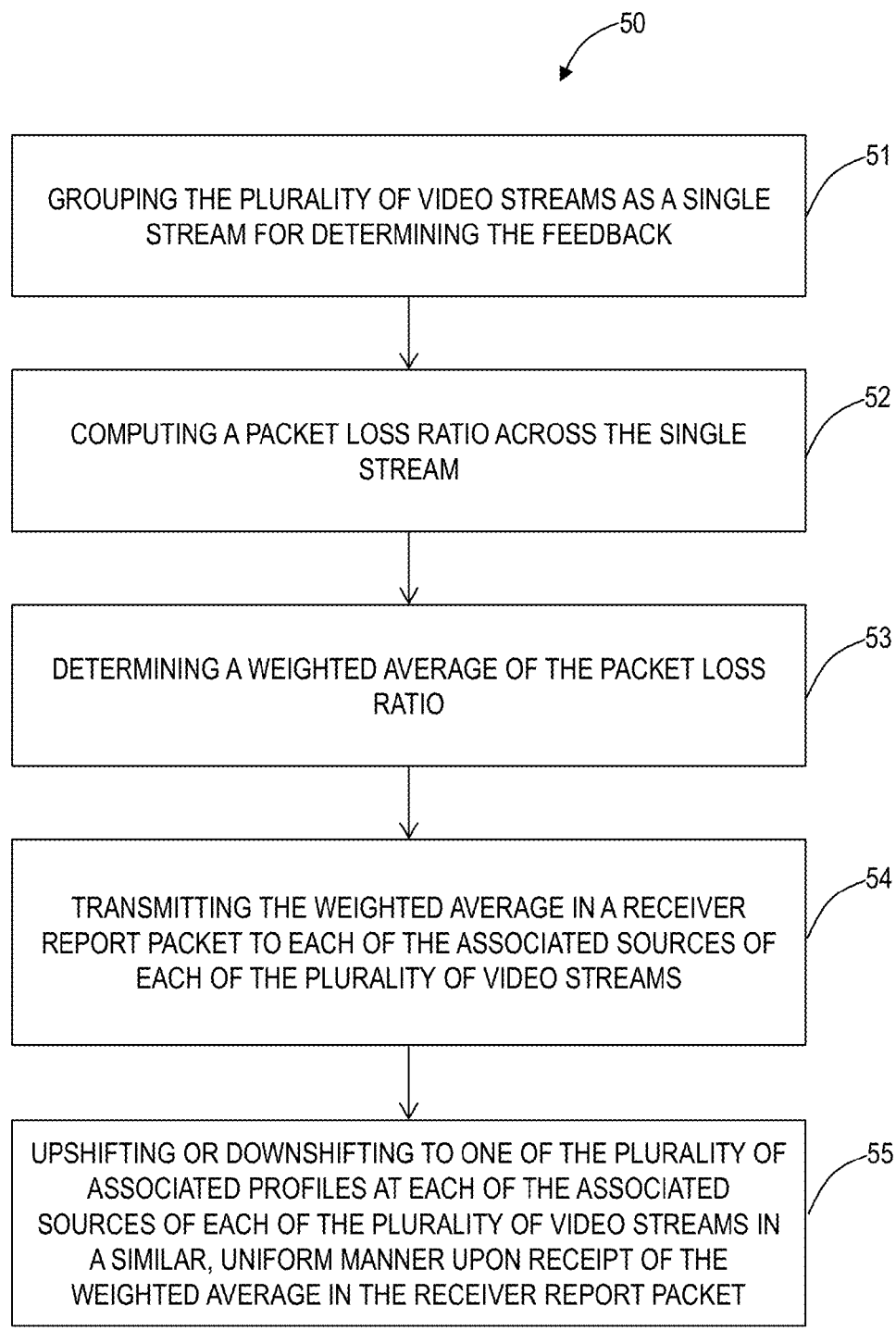
FIG. 5 is a flowchart of an averaged report method for use with the client-based method of FIG. 3 in accordance with some embodiments.

Referring to FIG. 5, in an exemplary embodiment, a flowchart illustrates an averaged report method 50 for use with the client-based method 30 of FIG. 3. For example, the averaged report method 50 can be an implementation of the "averaged" reports described herein. The averaged report method 50 includes grouping the plurality of video streams as a single stream for determining the feedback (step 51). Note, the plurality of video streams is still received and displayed separately, but are grouped for feedback determination. The averaged report method 50 includes computing a packet loss ratio across the single stream (step 52).

The averaged report method 50 further includes determining a weighted average of the packet loss ratio (step 53). For example, this determination can be done through the following equation:

$$PLR_t = \sum_{i=1}^{n} (PLR_i * R_i) / \sum_{i=1}^{n} R_i$$

Where $PLR_t$ is the overall packet loss ratio (PLR), $PLR_i$ is the PLR of individual video stream i with i being the number of video streams, and $R_i$ is the bit rate of the individual video streams.

The averaged report method 50 further includes transmitting the weighted average in a Receiver Report packet to each of the associated sources of each of the plurality of video streams (step 54). Finally, the averaged report method 50 includes upshifting or downshifting to one of the plurality of associated profiles at each of the associated sources of each of the plurality of video streams in a similar, uniform manner upon receipt of the weighted average in the Receiver Report packet.

Figure 6:
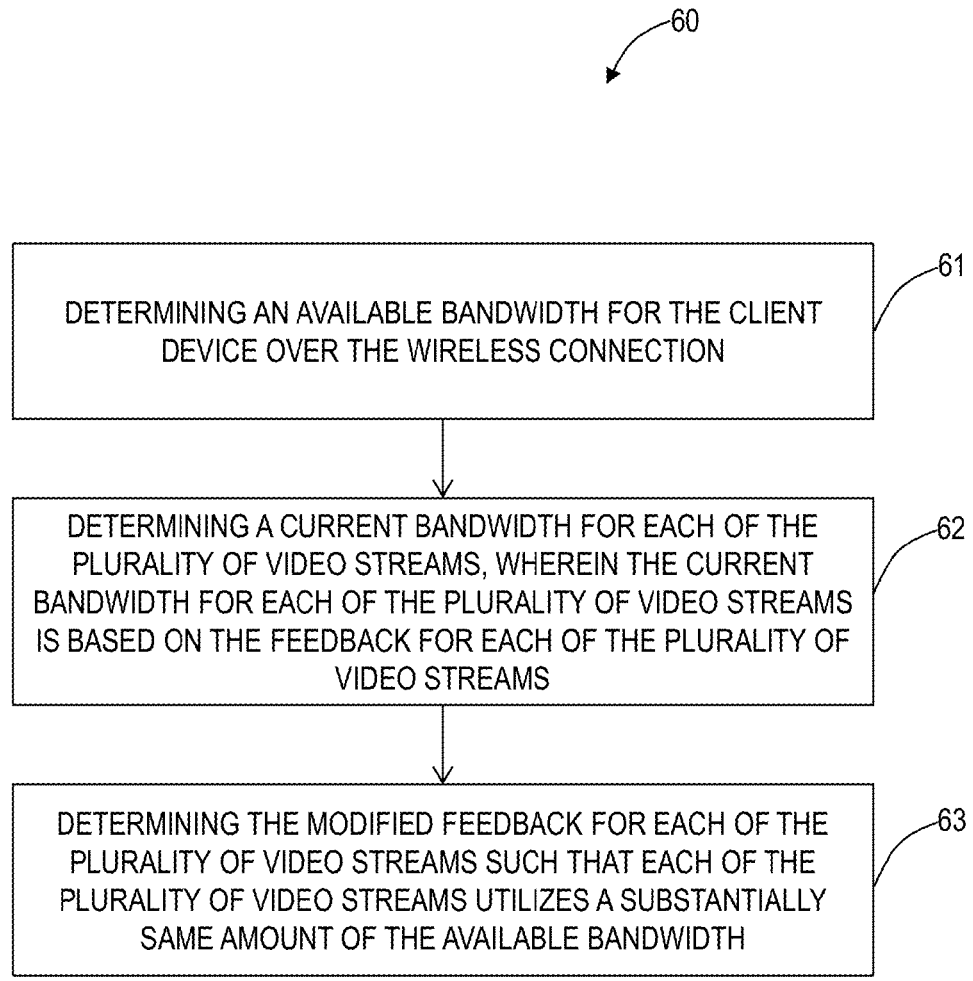
FIG. 6 is a flowchart of a manipulated report method for use with the client-based method of FIG. 3 in accordance with some embodiments.

Referring to FIG. 6, in an exemplary embodiment, a flowchart illustrates a manipulated report method 60 for use with the client-based method 30 of FIG. 3. For example, the manipulated report method 60 can be an implementation of the "manipulated" reports described herein. The manipulated report method 60 includes determining an available bandwidth for the client device over the wireless connection (step 61). The manipulated report method 60 includes determining a current bandwidth for each of the plurality of video streams, wherein the current bandwidth for each of the plurality of video streams is based on the feedback for each of the plurality of video streams (step 62).

The manipulated report method 60 includes determining the modified feedback for each of the plurality of video streams such that each of the plurality of video streams utilizes a substantially same amount of the available bandwidth (step 63). In an exemplary embodiment, at least two of the plurality of video streams are operating at different profiles of the plurality of associated profiles. Specifically, the manipulated report method 60 does not necessarily upshift and/or downshift the plurality of video streams in a consolidated or uniform manner. Rather, the manipulated report method 60 seeks to manage the expected bit rate at the client device such that each of the plurality of video streams has substantially the same amount of bandwidth.

Figure 7:
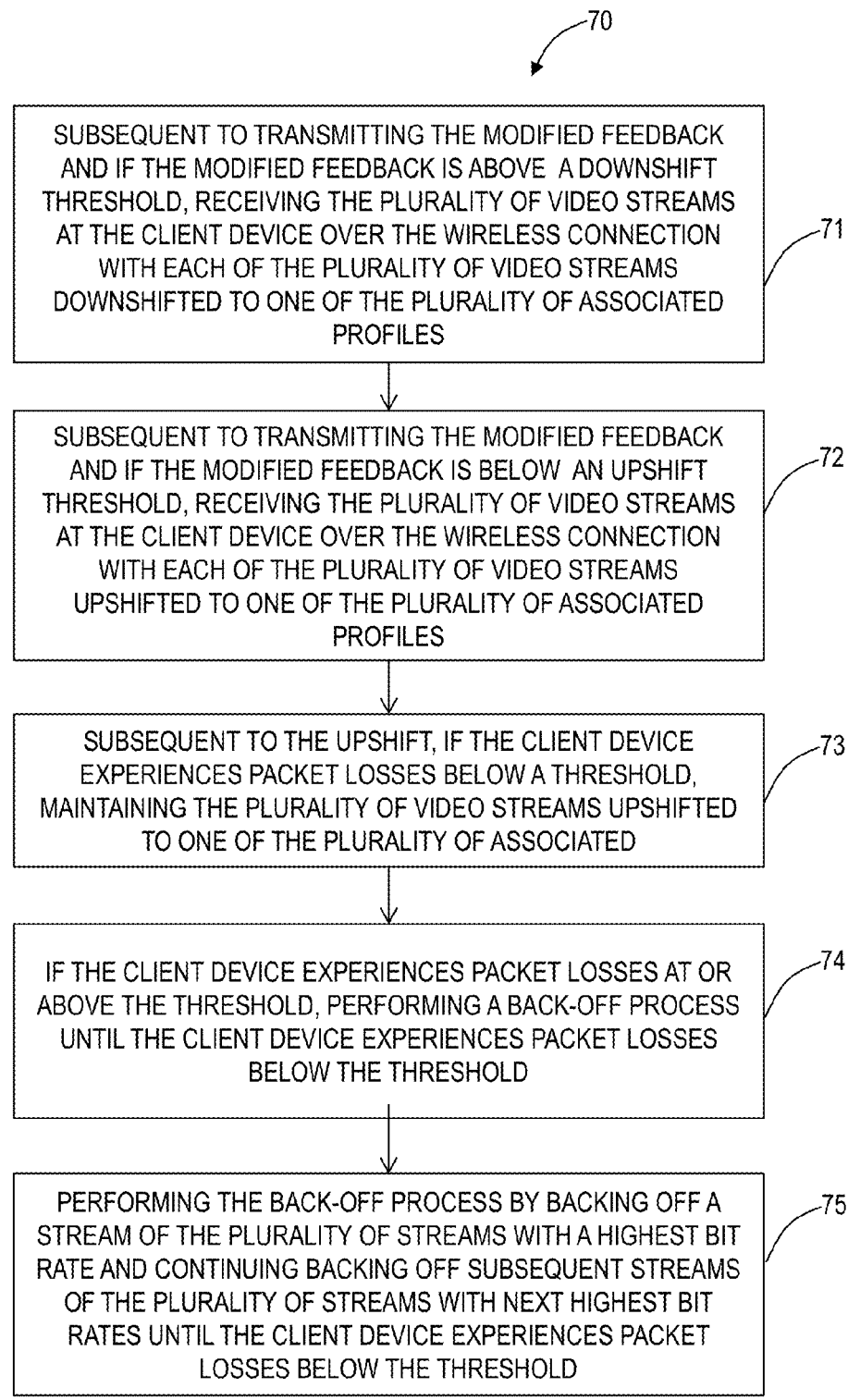
FIG. 7 is a flowchart of an upshift/downshift method for use with the client-based method of FIG. 3 in accordance with some embodiments.

Referring to FIG. 7, in an exemplary embodiment, a flowchart illustrates an upshift/downshift method 70 for use with the client-based method 30 of FIG. 3. The upshift/downshift method 70 includes, subsequent to transmitting the modified feedback and if the modified feedback is above a downshift threshold, receiving the plurality of video streams at the client device over the wireless connection with each of the plurality of video streams downshifted to one of the plurality of associated profiles (step 71). The upshift/downshift method 70 includes, subsequent to transmitting the modified feedback and if the modified feedback is below an upshift threshold, receiving the plurality of video streams at the client device over the wireless connection with each of the plurality of video streams upshifted to one of the plurality of associated profiles (step 72).

The upshift/downshift method 70 includes, subsequent to the upshift, if the client device experiences packet losses below a threshold, maintaining the plurality of video streams upshifted to one of the plurality of associated (step 73). The upshift/downshift method 70 further includes if the client device experiences packet losses at or above the threshold, performing a back-off process until the client device experiences packet losses below the threshold (step 74). The upshift/downshift method 70 further includes performing the back-off process by backing off a stream of the plurality of streams with a highest bit rate and continuing backing off subsequent streams of the plurality of streams with next highest bit rates until the client device experiences packet losses below the threshold (step 75).

Figure 8:
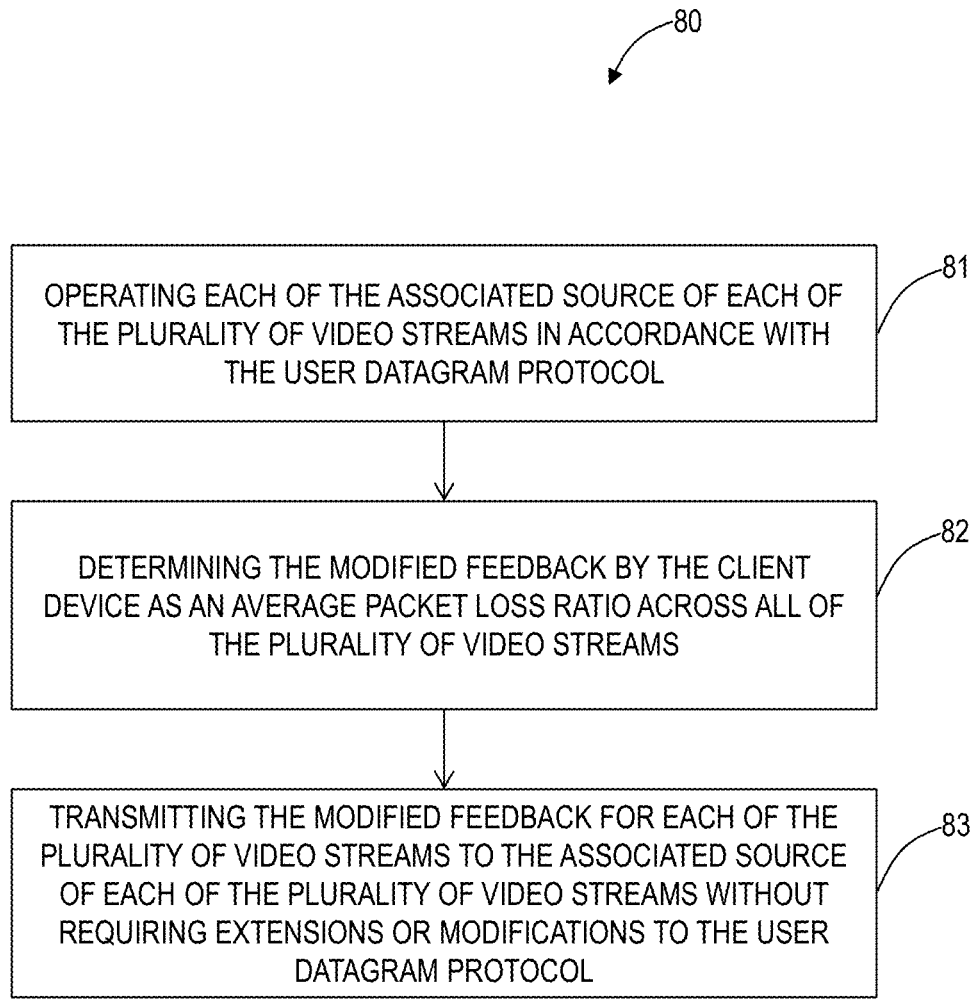
FIG. 8 is a flowchart of a UDP method for use with the client-based method of FIG. 3 in accordance with some embodiments.

Referring to FIG. 8, in an exemplary embodiment, a flowchart illustrates a UDP method 80 for use with the client-based method 30 of FIG. 3. The UDP method 80 includes operating each of the associated source of each of the plurality of video streams in accordance with the User Datagram Protocol (step 81). The UDP method 80 further includes determining the modified feedback by the client device as an average packet loss ratio across all of the plurality of video streams (step 82). Finally, the UDP method 80 includes transmitting the modified feedback for each of the plurality of video streams to the associated source of each of the plurality of video streams without requiring extensions or modifications to the User Datagram Protocol (step 83).

Figure 9:
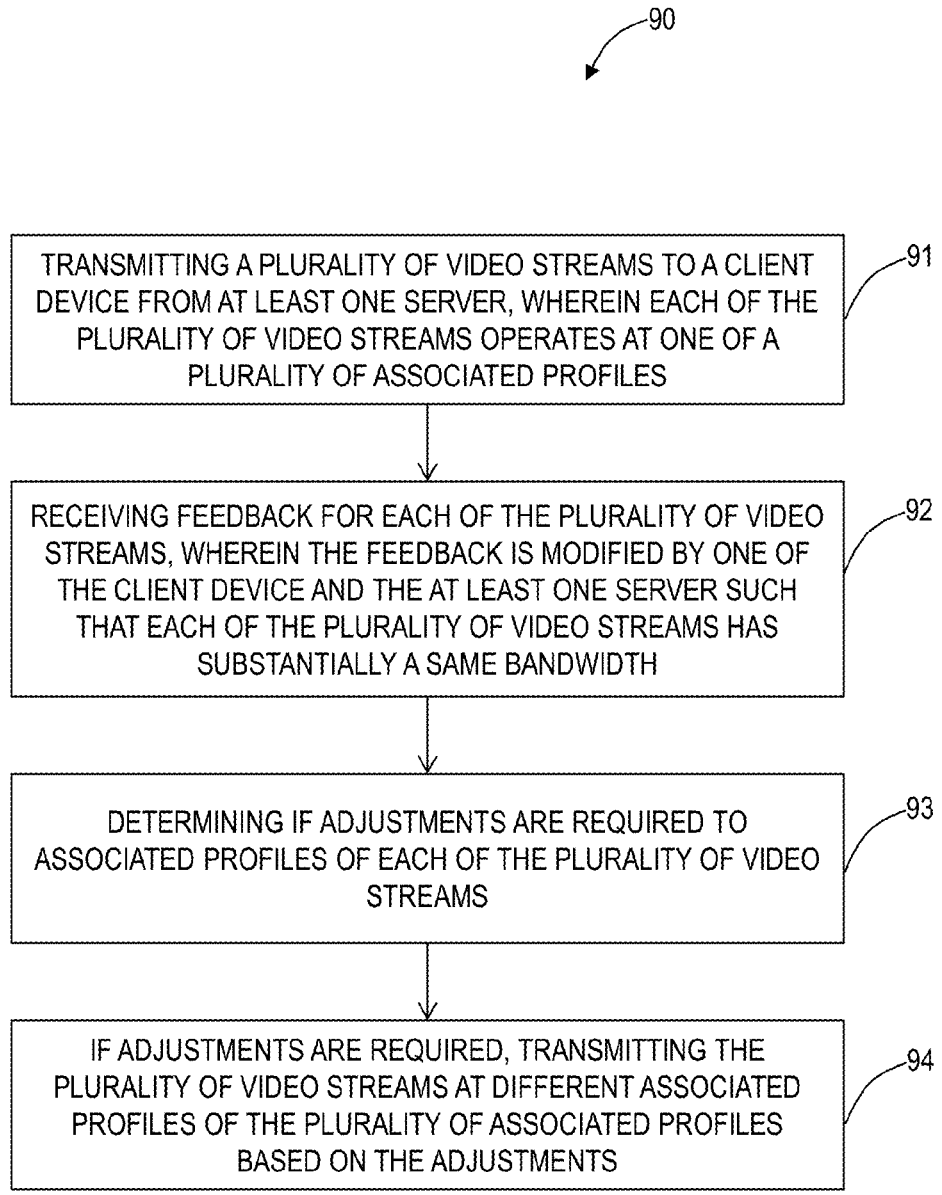
FIG. 9 is a flowchart of a server-based method for fairly sharing bandwidth across multiple video streams in accordance with some embodiments.

Referring to FIG. 9, in an exemplary embodiment, a flowchart illustrates a server-based method 90 for fairly sharing bandwidth across multiple video streams. In an exemplary embodiment, the server-based method 90 can be implemented by the server 20 in the system 10. For example, the server 20 can include a network interface communicatively coupled to a network, such as the network 16, a processor communicatively coupled to the network interface, and memory storing instructions that, when executed, cause the processor and the network interface to perform the various steps described herein. The server-based method 90 includes transmitting a plurality of video streams to a client device from at least one server, wherein each of the plurality of video streams operates at one of a plurality of associated profiles (step 91).

The server-based method 90 further includes receiving feedback for each of the plurality of video streams, wherein the feedback is modified by one of the client device and the at least one server such that each of the plurality of video streams has substantially a same bandwidth (step 92). The feedback can be modified via the various methods described herein. The server-based method 90 includes determining if adjustments are required to associated profiles of each of the plurality of video streams (step 93). Finally, server-based method 90 can include, if adjustments are required, transmitting the plurality of video streams at different associated profiles of the plurality of associated profiles based on the adjustment (step 94).

Figure 10:
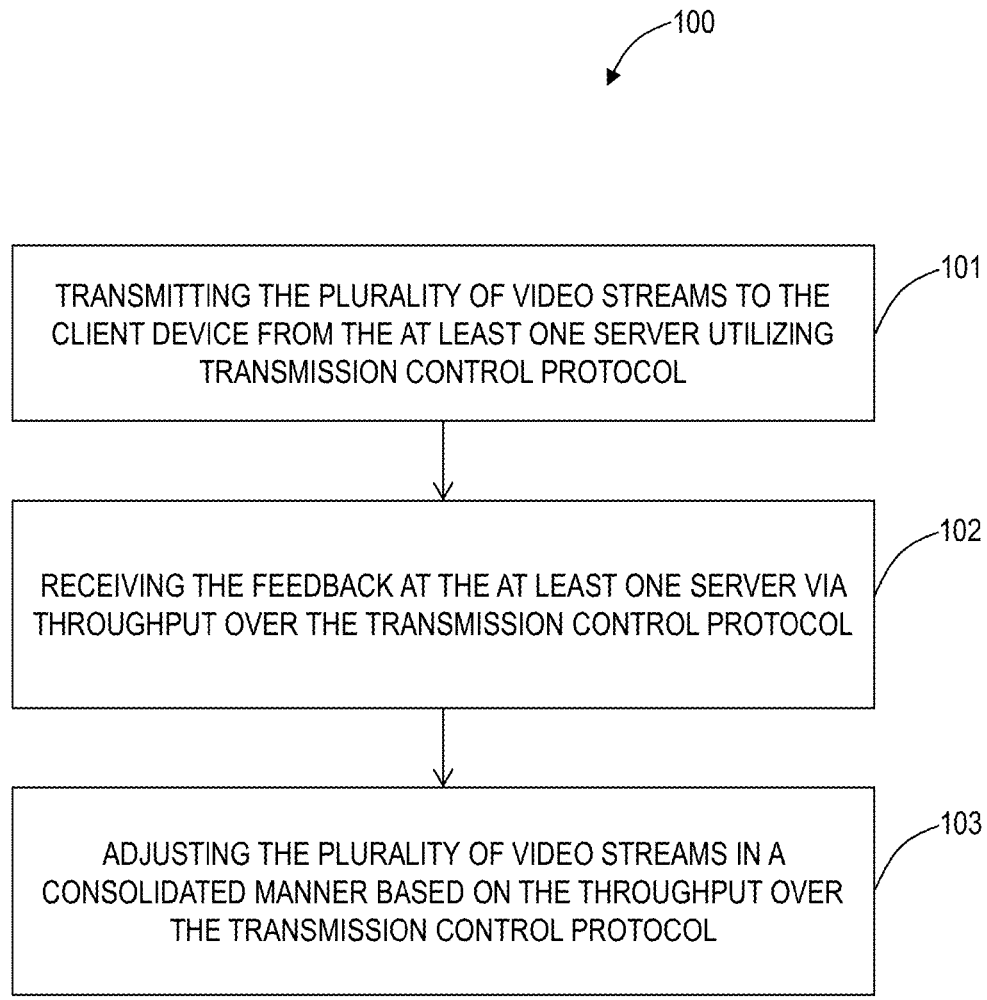
FIG. 10 is a flowchart of a Transmission Control Protocol (TCP) method for use with the server-based method of FIG. 9 in accordance with some embodiments.

Referring to FIG. 10, in an exemplary embodiment, a flowchart illustrates a TCP method 100 for use with the server-based method 90 of FIG. 9. The TCP method 100 includes transmitting the plurality of video streams to the client device from the at least one server utilizing Transmission Control Protocol (step 101). The TCP method 100 further includes receiving the feedback at the at least one server via throughput over the Transmission Control Protocol (step 102). Finally, the TCP method 100 includes adjusting the plurality of video streams in a consolidated manner based on the throughput over the Transmission Control Protocol (step 103).

Figure 11:
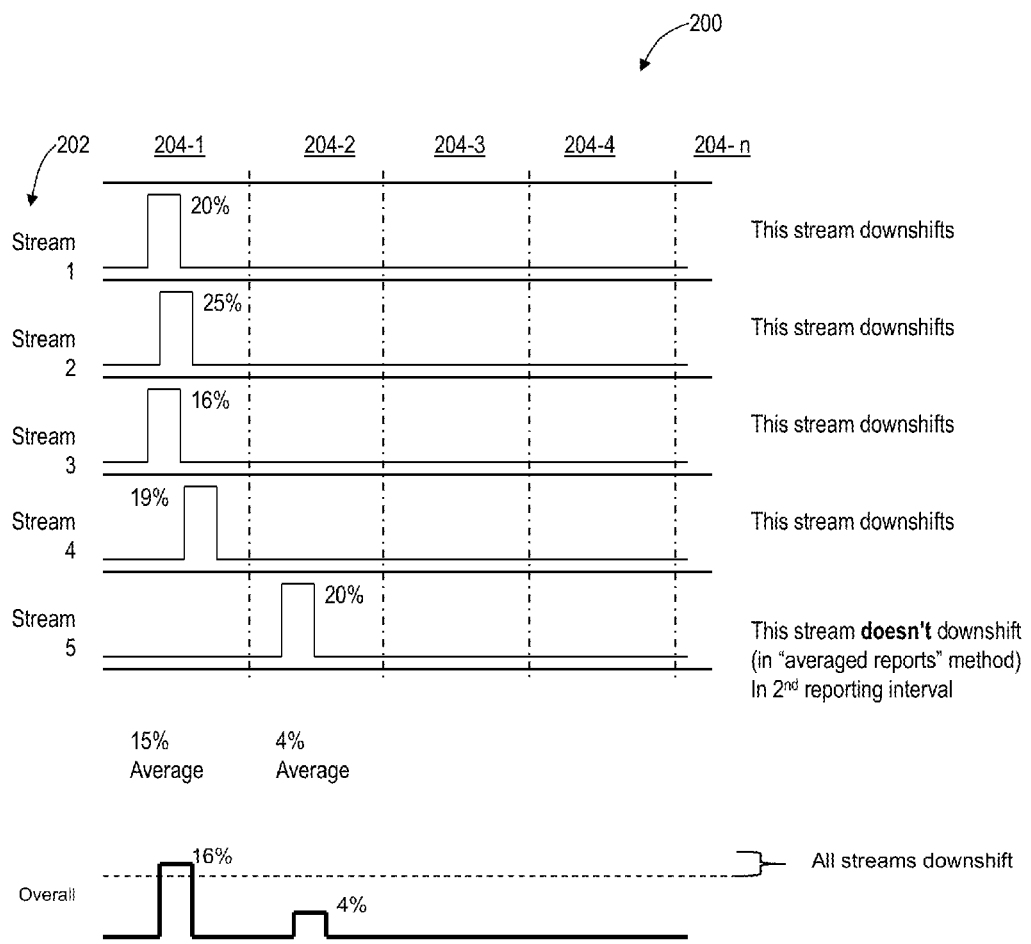
FIG. 11 is a diagram of an exemplary operation of an average report method in accordance with some embodiments.

Referring to FIG. 11, in an exemplary embodiment, a diagram illustrates an exemplary operation 200 of an average report method. The exemplary operation 200 includes five streams 202 to the client device 12 showing packet loss ratio for a plurality of reporting intervals 204 (labeled 204-1, 204-2, 204-*n*). In the first reporting interval 204-1, stream 1 has PLR=20%, stream 2 has PLR=25%, stream 3 has PLR=16%, stream 4 has PLR=19%, and stream 5 has PLR=0%. This yields an average PLR=16% which is reported to each of the associated sources of each of the streams 202. That is, stream 1 reports PLR=16% even though it's actual PLR=20%, etc. Assuming a threshold of 15%, each of the streams will downshift in the reporting interval 204-1. In the reporting interval 204-2, each stream has PLR=0% except the stream 5 which has PLR=20%. Thus, in the reporting interval 204-2, each stream reports PLR=4% based thereon.

Figure 12:
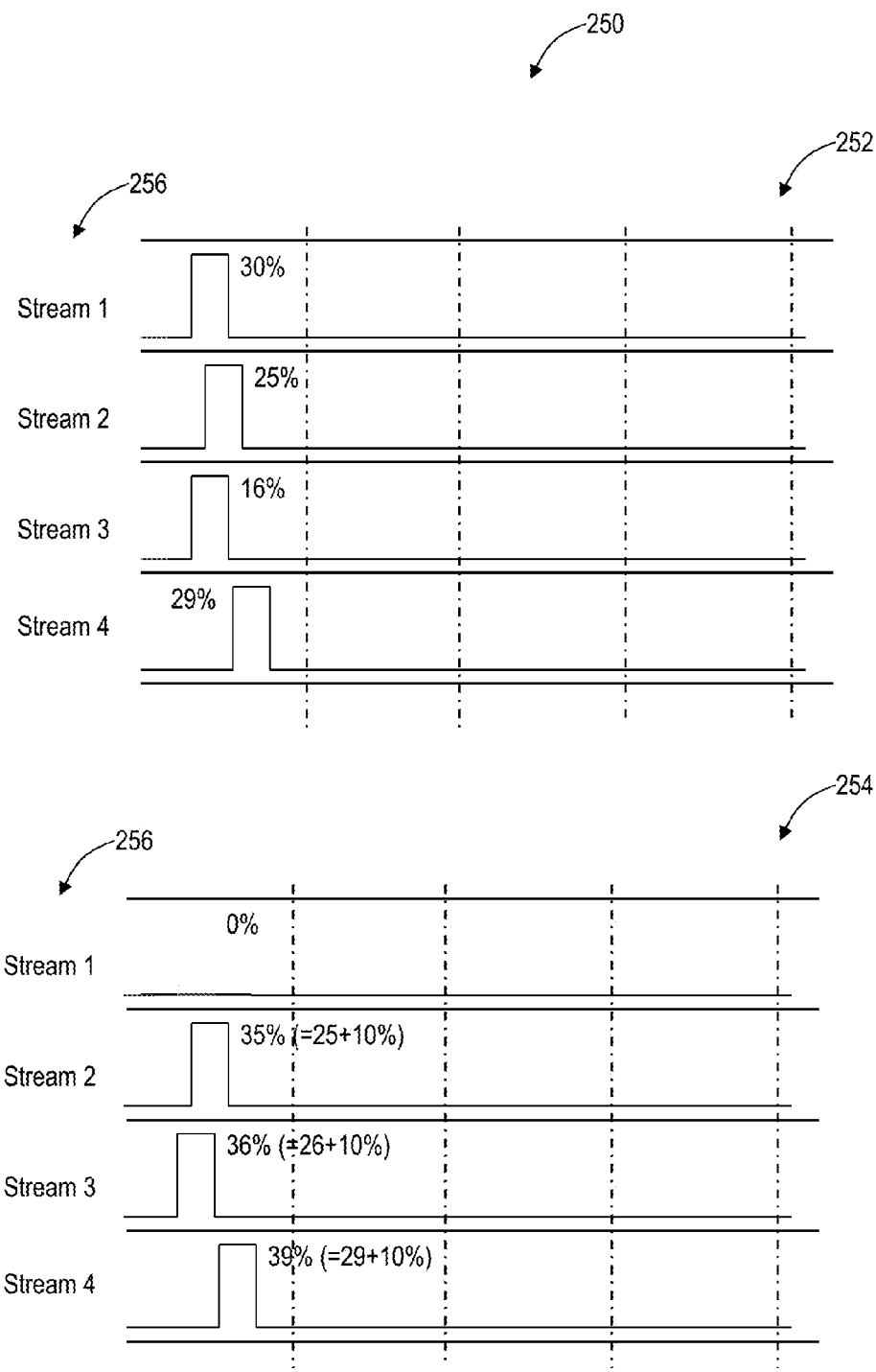
FIG. 12 is a diagram of an exemplary operation of a manipulated report method in accordance with some embodiments.

Referring to FIG. 12, in an exemplary embodiment, a diagram illustrates an exemplary operation 250 of a manipulated report method. In particular, the exemplary operation 250 is illustrated with two graphs 252, 254 of four streams 256. The graph 252 represents actual loss experienced by each of the four streams 256, i.e. 30%, 25%, 16%, and 29%. The graph 254 represents the actual loss reported by each of the four streams 256 using the manipulated report method. In particular, the client receiving the four streams 256 manipulates the actual reports sent to a server. In the exemplary operation 250, the first stream has a high priority, so the client manipulates the packet loss ratio to 0% and reports 0%. The actual loss of the first stream, i.e. 30%, can be equally distributed across the remaining streams, i.e. 10% each. Thus, using the manipulated report method, the first stream 1 is not downshifted because of the manipulated reports.

Figure 13:
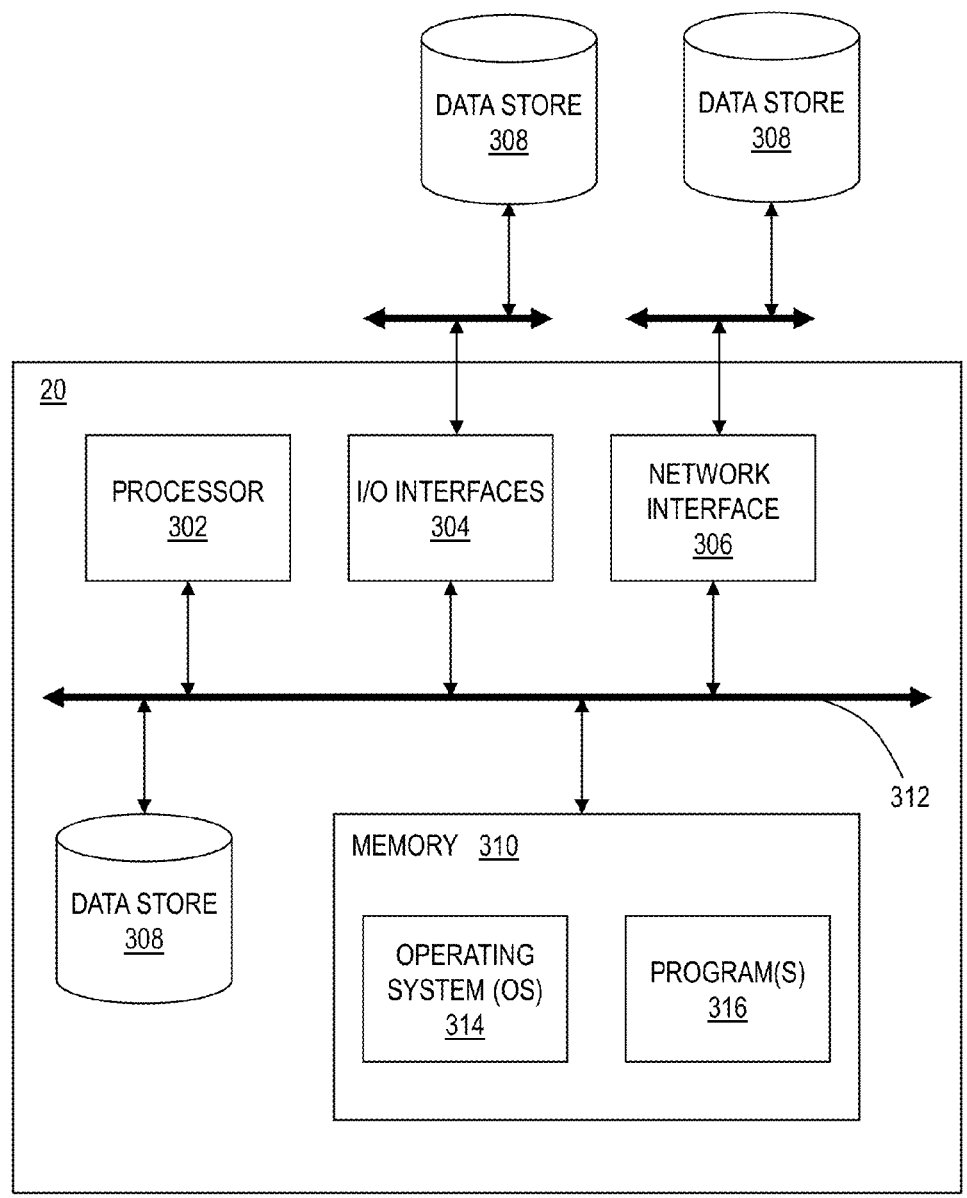
FIG. 13 is a block diagram of a server for use in the system of FIG. 1 and the various methods in accordance with some embodiments.

Referring to FIG. 13, in an exemplary embodiment, a block diagram illustrates the server 20 for use in the system 10 and the various methods. The server 20 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 13 depicts the server 20 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 302 is configured to execute software stored within the memory 310, to communicate data to and from the memory 310, and to generally control operations of the server 20 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 20 to communicate on a network, such as the network 16 to receive parameters associated with mobile devices. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 20 such as, for example, an internal hard drive connected to the local interface 312 in the server 20. Additionally in another embodiment, the data store 308 can be located external to the server 20 such as, for example, an external hard drive connected to the I/O interfaces 304 (e.g., SCSI or USB connection). In a further embodiment, the data store 308 can be connected to the server 20 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein. For example, the programs 316 can be configured to enable the methods described herein.

Figure 14:
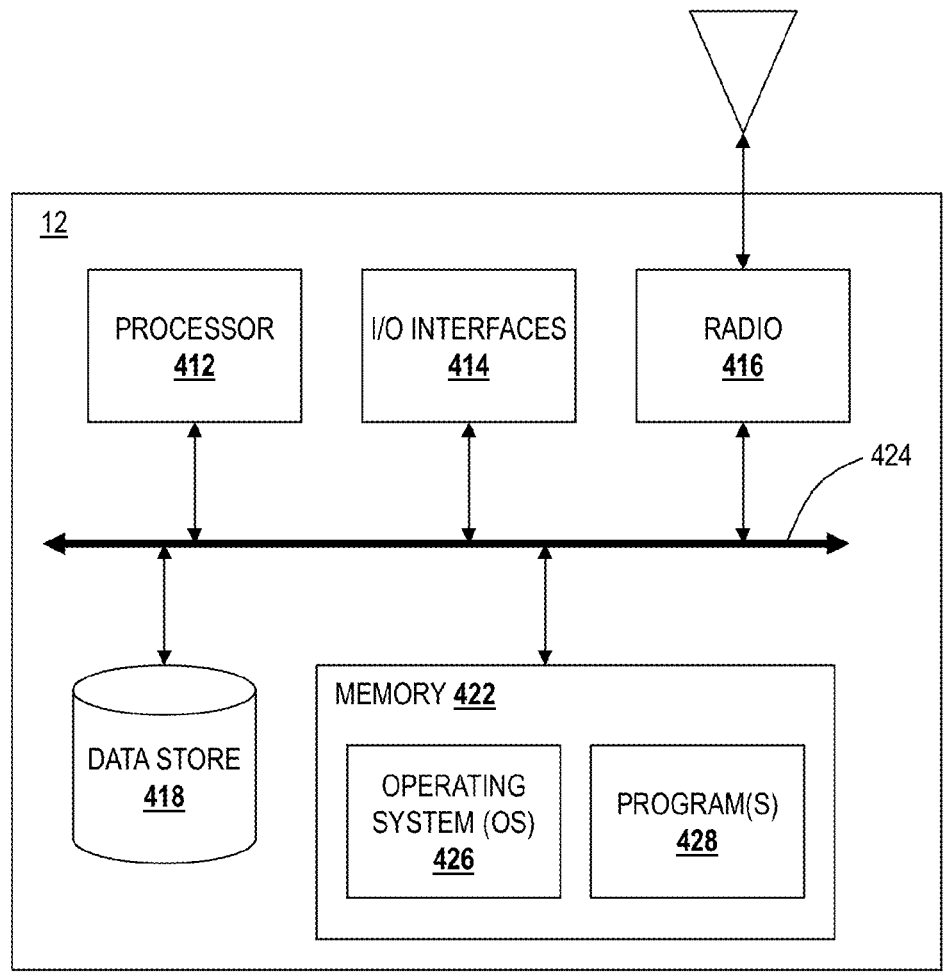
FIG. 14 is a block diagram illustrates the client device 12 for use in the system 10 and the various methods in accordance with some embodiments.

Referring to FIG. 14, in an exemplary embodiment, a block diagram illustrates the client device 12 for use in the system 10 and the various methods. The client device 12 can be a digital device that, in terms of hardware architecture, generally includes a processor 412, input/output (I/O) interfaces 414, a radio 416, a data store 418, and memory 422. It should be appreciated by those of ordinary skill in the art that FIG. 14 depicts the client device 12 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the client device 12, a semiconductor-based microprocessor (in the form of a microchip or chip set), or generally any device for executing software instructions. When the client device 12 is in operation, the processor 412 is configured to execute software stored within the memory 422, to communicate data to and from the memory 422, and to generally control operations of the client device 12 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the client device 12 Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 13, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the client device 12. For example, exemplary programs 428 can include, but not limited to, a web browser, social networking applications, streaming media applications, games, mapping and location applications, electronic mail applications, financial applications, and the like.

In an exemplary embodiment, the programs 428 include instructions that, when executed, cause the processor and the network interface to receive a plurality of video streams at a client device over the wireless network, wherein each of the plurality of video streams operates at one of a plurality of associated profiles, determine feedback for each of the plurality of video streams, determine modified feedback for each of the plurality of video streams based on the feedback for each of the plurality of video streams, and transmit the modified feedback for each of the plurality of video streams to an associated source of each of the plurality of video streams. The instructions, when executed, can further cause the processor and the network interface to: utilize Real Time Control Protocol and Real Time Protocol between the associated source of each of the plurality of video streams, determine the feedback for each of the plurality of video streams utilizing packet loss ratio, and transmit the modified feedback in a Receiver Report packet for each of the plurality of video streams to the associated source of each of the plurality of video streams without requiring extensions or modifications to the Real Time Control Protocol and the Real Time Protocol. The instructions, when executed, can further cause the processor and the network interface to: group the plurality of video streams as a single stream for determining the feedback, compute a packet loss ratio across the single stream, determine a weighted average of the packet loss ratio, and transmit the weighted average in a Receiver Report packet to each of the associated sources of each of the plurality of video streams.

The instructions, when executed, can further cause the processor and the network interface to: determine an available bandwidth for the client device over the wireless connection, determine a current bandwidth for each of the plurality of video streams, wherein the current bandwidth for each of the plurality of video streams is based on the feedback for each of the plurality of video streams, and determine the modified feedback for each of the plurality of video streams such that each of the plurality of video streams utilizes a substantially same amount of the available bandwidth.

The instructions, when executed, can further cause the processor and the network interface to: operate between each of the associated source of each of the plurality of video streams in accordance with the User Datagram Protocol, determine the modified feedback as an average packet loss ratio across all of the plurality of video streams, and transmit the modified feedback for each of the plurality of video streams to the associated source of each of the plurality of video streams without requiring extensions or modifications to the User Datagram Protocol.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A client-based method, comprising: receiving more than one video stream at a client device over a wireless connection, wherein each of the more than one video stream operates at one of a plurality of bit rates;
   utilizing Real Time Control Protocol (RTCP) and Real Time Protocol between the client device and the associated source of each of the more than one video stream;
   determining quality feedback for each of the more than one video stream utilizing packet loss ratio;
   determining modified quality feedback for each of the more than one video stream wherein the modified quality feedback is based on the quality feedback for each of the more than one video stream; and
   transmitting the modified quality feedback in a RTCP Receiver Report for each of the more than one video stream to an associated source of each of the more than one video stream so that multiple RTCP receiver Reports are transmitted, each having a same modified quality feedback transmitted to each source of the more than one video stream so that each source of the more than one video stream upshifts or downshifts each of the more than one video stream in a uniform manner.

2. The client-based method of claim 1, further comprising:
   operating each of the associated sources of each of the more than one video stream in accordance with the Real Time Control Protocol and the Real Time Protocol;

determining the modified quality feedback by the client device; and transmitting the modified quality feedback for each of the more than one video stream to the associated source of each of the more than one video stream.

3. The client-based method of claim 1, further comprising:

determining the quality feedback for each of the more than one video stream utilizing packet loss ratio; and transmitting the modified quality feedback in a Receiver Report packet to each of the associated sources of each of the more than one video stream.

4. The client-based method of claim 1, further comprising:

grouping the more than one video stream as a single stream for determining the quality feedback;

computing a packet loss ratio across the single stream;

determining a weighted average of the packet loss ratio; and transmitting the weighted average in a Receiver Report packet to each of the associated sources of each of the more than one video stream.

5. The method of claim 4, further comprising:

upshifting or downshifting to one of the plurality of associated bit rates at each of the associated sources of each of the more than one video stream in a similar, uniform manner upon receipt of the weighted average in the Receiver Report packet.

6. The client-based method of claim 1, further comprising:

determining an available bandwidth for the client device over the wireless connection;

determining a current bandwidth for each of the more than one video stream, wherein the current bandwidth for each of the more than one video stream is based on the quality feedback for each of the more than one video stream; and determining the modified quality feedback for each of the more than one video stream such that each of the more than one video stream utilizes a same amount of the available bandwidth.

7. The client-based method of claim 6, wherein at least two of the more than one video stream are operating at different bit rates of the plurality of associated bit rates.

8. The client-based method of claim 1, further comprising:

subsequent to transmitting the modified quality feedback and if the modified quality feedback is above a downshift threshold, receiving the more than one video stream at the client device over the wireless connection with each of the more than one video stream downshifted to one of the plurality of associated bit rates.

9. The client-based method of claim 1, further comprising:

subsequent to transmitting the modified quality feedback and if the modified quality feedback is below an upshift threshold, receiving the more than one video stream at the client device over the wireless connection with each of the more than one video stream upshifted to one of the plurality of associated bit rates.

10. The client-based method of claim 9, further comprising:

subsequent to the upshift, if the client device experiences packet losses below a threshold, maintaining the more than one video stream upshifted to one of the plurality of associated; and if the client device experiences packet losses at or above the threshold, performing a back-off process until the client device experiences packet losses below the threshold.

11. The client-based method of claim 10, further comprising:

performing the back-off process by backing off a stream of the plurality of streams with a highest bit rate and continuing backing off subsequent streams of the plurality of streams with next highest bit rates until the client device experiences packet losses below the threshold.

12. The method of claim 1, further comprising:

operating each of the associated source of each of the more than one video stream in accordance with the User Datagram Protocol;

determining the modified quality feedback by the client device as an average packet loss ratio across all of the more than one video stream; and transmitting the modified quality feedback for each of the more than one video stream to the associated source of each of the more than one video stream.

13. A client device, comprising:

a network interface communicatively coupled to a wireless network;

a processor communicatively coupled to the network interface; and memory storing instructions that, when executed, cause the processor and the network interface to:

receive more than one video stream at a client device over the wireless network, wherein each of the more than one video stream operates at one of a plurality of associated bit rates;

determine quality feedback for each of the more than one video stream;

determine modified quality feedback for each of the more than one video stream wherein the modified quality feedback is based on the quality feedback for each of the more than one video stream; and transmit the modified quality feedback for each of the more than one video stream to an associated source of each of the more than one video stream;

utilize Real Time Control Protocol (RTCP) and Real Time Protocol between the associated source of each of the more than one video stream;

determine the quality feedback for each of the more than one video stream utilizing packet loss ratio; and transmit the modified quality feedback in a RTCP Receiver Report packet for each of the more than one video stream to the associated source of each of the more than one video stream so that multiple RTCP receiver Reports are transmitted, each having a same modified quality feedback transmitted to each source of the more than one video stream so that each source of the more than one video stream upshifts or downshifts each of the more than one video stream in a uniform manner.

14. The client device of claim 13, wherein the instructions, when executed, further cause the processor and the network interface to:

group the more than one video stream as a single stream for determining the quality feedback;

compute a packet loss ratio across the single stream;

determine a weighted average of the packet loss ratio; and transmit the weighted average in a Receiver Report packet to each of the associated sources of each of the more than one video stream.

15. The client device of claim 13, wherein the instructions, when executed, further cause the processor and the network interface to:

determine an available bandwidth for the client device over the wireless connection;

determine a current bandwidth for each of the more than one video stream, wherein the current bandwidth for each of the more than one video stream is based on the quality feedback for each of the more than one video stream; and determine the modified quality feedback for each of the more than one video stream such that each of the more than one video stream utilizes a same amount of the available bandwidth.

16. The client device of claim 13, wherein the instructions, when executed, further cause the processor and the network interface to:

operate between each of the associated source of each of the more than one video stream in accordance with the User Datagram Protocol;

determine the modified quality feedback as an average packet loss ratio across all of the more than one video stream; and transmit the modified quality feedback for each of the more than one video stream to the associated source of each of the more than one video stream.

\* \* \* \* \*